United States Patent [19]
Ruger et al.

[11] Patent Number: 5,619,862
[45] Date of Patent: Apr. 15, 1997

[54] MULTI-CHANNEL MOTOR VEHICLE VENTILATION APPARATUS

[75] Inventors: Tim Ruger, Rockford; Phillip Evans, Loves Park; Dave Gavin, Rockford; William G. Guo, Davis Junction, all of Ill.

[73] Assignee: Bergstrom Manufacturing Co., Rockford, Ill.

[21] Appl. No.: 513,686

[22] Filed: Aug. 11, 1995

[51] Int. Cl.[6] ................................................. F25D 17/04
[52] U.S. Cl. ................................ 62/409; 62/411; 62/412; 454/253; 165/202
[58] Field of Search ....................... 62/239, 404, 408, 62/409–410, 411, 412; 454/83, 103, 104, 105, 108, 109, 142, 160–241, 253; 165/16, 42, 65

[56] References Cited

U.S. PATENT DOCUMENTS

| | | | |
|---|---|---|---|
| 2,784,568 | 3/1957 | Schjolin | 62/239 |
| 3,326,110 | 6/1967 | Orr | 454/160 |
| 3,656,541 | 4/1972 | Coyle et al. | 165/42 |
| 3,948,312 | 4/1976 | Nisbet | 165/16 |
| 4,125,150 | 11/1978 | Zelger et al. | 164/42 |
| 4,513,808 | 4/1985 | Ito et al. | 165/43 |
| 4,570,450 | 2/1986 | Takemi et al. | 62/199 |
| 5,062,473 | 11/1991 | Ostrand et al. | 165/42 |

*Primary Examiner*—William Doerrler
*Attorney, Agent, or Firm*—Leydig, Voit & Mayer, Ltd.

[57] ABSTRACT

A dual channel motor vehicle ventilation apparatus provides independent air temperature control. The apparatus comprises a housing having at least one air inlet and a first and second air outlet. First and second fluid communication channels are provided within the housing and defined air passages extending between the at least one air inlet and the first and second air outlets. First and second blowers are associated with the first and second air outlets, respectively, and serve to suction air from the air inlet, through the first and second fluid communication channels, and expel the air through the respective air outlet. A heating coil is included within the housing and disposed to project at least partially into the first and second fluid communication channels. First and second flow valves are disposed within the first and second fluid communication channels and are independently operable to direct a portion of the air flowing through each fluid communication channel across the heating coil. Varying the position of the first and second flow valves controllably varies the temperature of the air expelled from the corresponding air outlet.

18 Claims, 4 Drawing Sheets

MULTI-CHANNEL MOTOR VEHICLE VENTILATION APPARATUS

FIELD OF THE ART

The present invention generally relates to vehicular ventilation systems, and more particularly to a motor vehicle ventilation apparatus providing multiple channel temperature control.

BACKGROUND OF THE INVENTION

Vehicular heating and air-conditioning systems are known wherein independent dual temperature control is provided. For example, heavy-duty trucks such as large tractor trailer vehicles have independent temperature control for a cab area and a bunk area. Indeed, even smaller vehicles are known to provide independent temperature control in a forward cab area and rear cab area.

In a typical automotive heating and air-conditioning system, a control panel is provided in the passenger compartment or cab area of the vehicle, and provides independent control over the fan speed as well as the air temperature. For example, a multi-position switch is commonly provided to allow selection among multiple fan speeds. A rheostat or other continuously variable control provides variable control over the air temperature selection. In vehicles having independent dual temperature control, separate controls are provided for independently controlling the operation of the blower fans and air temperature.

As is known, heat control is achieved by circulating water from the vehicle's cooling system through a set of heating coils, and air-conditioning is provided by circulating refrigerant through an evaporator, also known as cooling coils. Both the heating and cooling coils are typically disposed within a common housing. A blower is attached to the housing (blower unit) and is disposed to control the air flow through the system, as determined by the fan speed selected by a user or passenger. Air drawn by the blower across the heating coils delivers warm air to the cab of the vehicle, while air drawn across the cooling coils delivers cool air to the vehicle cab space. Air temperature control is provided by regulating the quantity of air that flows across either the cooling coils, the heating coils, or both.

Typically, the air drawn by the blower unit is directed across the cooling coils, to prevent the coils from freezing. Thus, temperature control is usually achieved by regulating the air flow across the heating coils. As warmer air is desired, a greater amount of air is directed across the heating coils. As cooler air is desired, a smaller amount of air is directed across the heating coils.

In a dual control system, having independent temperature and fan speed control, two separate blower units are provided, each having its own heating coils and cooling coils. As can be appreciated, this increases both the cost and complexity of the system. Significantly, two sets of heating coils and two sets of cooling coils are required. Also, additional connectors and fluid cabling, such as heater hose and refrigerant tubing are needed. This approach further dictates that additional space requirements are needed for the second blower unit, and this additional space requirement becomes particularly significant in dual control applications on smaller vehicles where space conservation is a significant aspect.

In view of the foregoing, a simpler and therefore more cost effective dual control vehicular ventilation system is desired.

SUMMARY OF THE INVENTION

Accordingly, it is a primary aim of the present invention to provide a simple and cost-effective dual control ventilation system for motor vehicles.

A more specific object of the present invention is to provide a dual control heating system for a motor vehicle, having a single set of heating coils.

A related object of the present invention is to provide a dual control air-conditioning system for a motor vehicle, having a single set of cooling coils.

Still another object of the present invention is to provide a dual control heating and air-conditioning system for a motor vehicle having improved space requirements.

Additional objects, advantages and other novel features of the invention will be set forth in the detailed description that follows with reference to the accompanying drawings and will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, the present invention is generally directed to a dual-channel vehicular ventilation apparatus. The apparatus includes a housing having at least one air inlet and first and second air outlets. First and second fluid communication channels are defined within the housing and extend between the at least one air inlet and the first and second air outlets. Specifically, a first fluid communication channel extends between the at least one air inlet and the first air outlet, while the second fluid communication channel extends between the at least one air inlet and the second air outlet. First and second blowers are disposed in connection with the housing and are associated with the first and second air outlets, wherein the first blower is disposed to direct air from the at least one air inlet, through the first fluid communication channel and out the first air outlet. The second blower is also disposed in connection with the housing to direct air from the at least one air inlet, through the second fluid communication channel, and out the second air outlet. A heating coil is disposed within the housing, and the first and second fluid communication channels are defined to controllably direct air, passing from the at least one air inlet to the first and second air outlets, across the heating coil to control the temperature of the air output from the first and second air outlets. In this regard, first and second flow valves are disposed within the first and second fluid communication channels to controllably direct a portion of the air flowing through each fluid communication channel across the heating coil. In this regard, the first and second flow valves are operable for movement between heat and cool positions. In the heat position, each valve serves to direct a maximum air flow across the heating coil. Conversely, in the cool position, each flow valves serves to direct a minimum air flow across the heating coil. In this way, controllably disposing the position of the first and second flow valves effectively controls the air temperature discharged through the air outlets of the housing.

BRIEF DESCRIPTION OF THE DRAWINGS

The accompanying drawings incorporated in and forming a part of the specification, illustrate several aspects of the present invention, and together with the description serve to explain the principals of the invention. In the drawings:

FIG. 7 is an elevated perspective view of a fluid flow valve of the present invention.

Reference will now be made in detail to various present preferred embodiments of the invention, examples of which are illustrated in the accompanying drawings. While the invention will be described in connection with these embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENT

Figure 1:
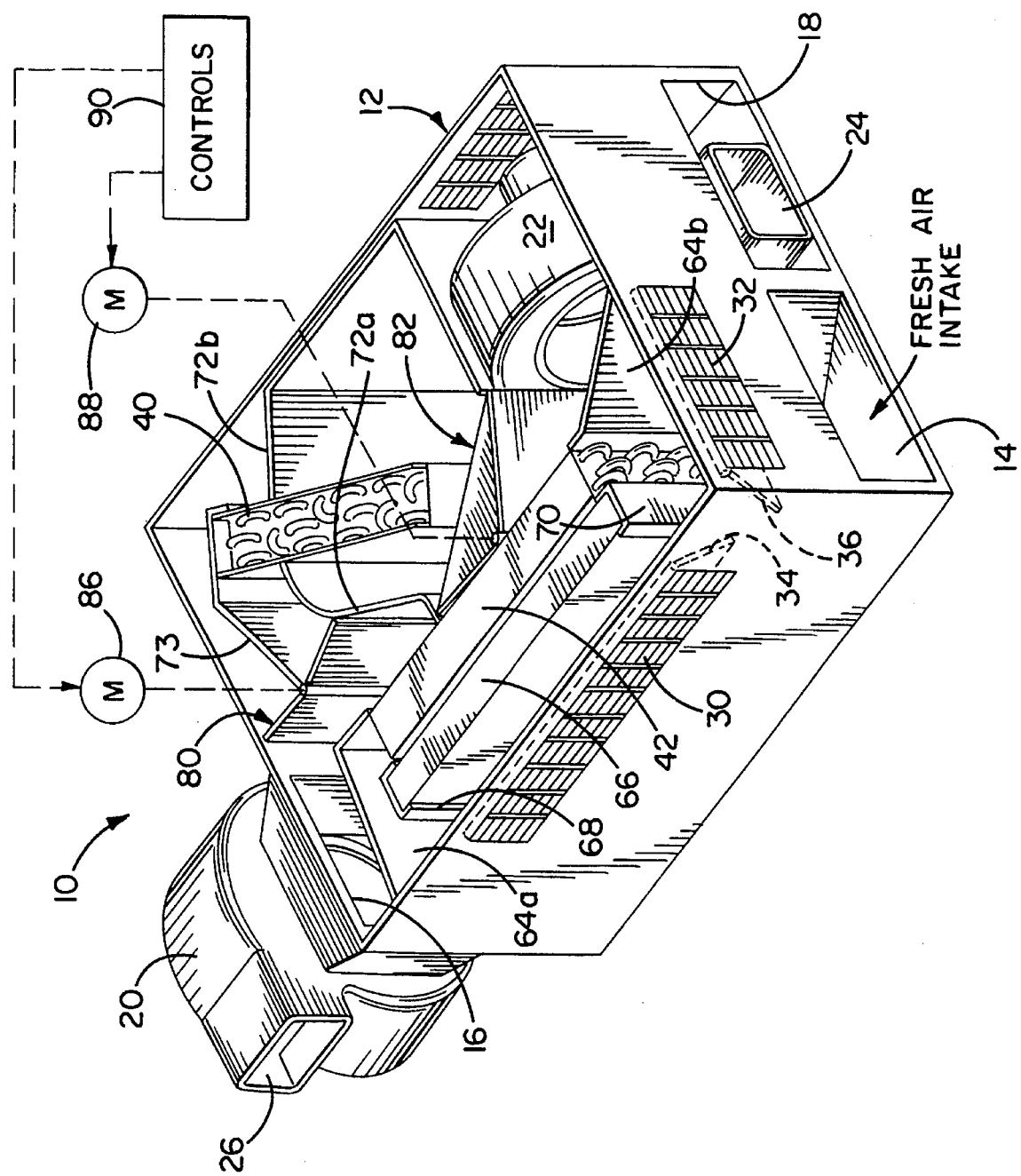
FIG. 1 is a perspective view of the preferred dual-channel vehicular ventilation apparatus.

Referring now to the drawings, FIG. 1 shows a perspective view (excluding the top cover) of the preferred multi-channel vehicular ventilation apparatus generally designated by reference numeral 10. The apparatus 10 generally comprises a housing 12 having at least one air inlet 14 and two air outlets 16 and 18. Blowers 20 and 22 are associated with each air outlet 16 and 18, respectively, and serve to suction air through the air intake 14 and expel it through the air outlets 16 and 18. In the preferred embodiment, blower 20 is mounted outside housing 12 at outlet 16, while blower 22 is disposed within the housing 12. Air within a chamber surrounding blower 22 is drawn through an intake of blower 22 and expelled through port 24. Similarly, air flowing through outlet 16 is drawn into an intake of blower 20 and expelled through port 26. Although not shown in the drawings, air passages are connected at ports 24 and 26 and routed through the vehicle to deliver the air output from the blowers 20 and 22 to the passenger space of the vehicle.

In addition to the fresh air intake 14, it is preferred to include at least one input for recirculated air. In the preferred embodiment, two such inputs 30 and 32 are provided. Air passages (again not shown) connect the fresh air intake 14 to the outside of the vehicle, while passages connect recirculation inlets 30 and 32 to the cab space or passenger space within the vehicle. As in known, efficiency gains are realized by recirculating air from the cab space through the ventilation apparatus. For example, if the ventilation system is configured to provide cool air to the cab space of the vehicle, greater efficiency is realized by providing cool air to the intake of the apparatus. The temperature of air input at the fresh air inlet 14 is dictated by the outside temperature, and the air temperature at recirculation inputs 30 and 32 is dictated by the air temperature in the vehicle cab space. Thus, if it is desired to expel cool air through the outlets 16 and 18, it will similarly be desired to draw cool air through the inputs. As the air temperature in the interior cab space cools, greater efficiency is achieved by drawing recirculated air through inlets 30 and 32. Similarly, if warm air is desired to be output from the apparatus, it will be desired to input warm air through the inlets. As the temperature in the cab space increases, efficiency gains will be realized by recirculating air through inlets 30 and 32.

In a somewhat competing fashion, however, it is also desired to provide a continuous fresh air intake to the cab space, rather than stale recirculated air. Accordingly, the preferred embodiment strikes a balance between these two competing interests by providing an unobstructed inlet 14 for fresh air, and partially obstructed inlets 30 and 32 for recirculated air. In this regard, gravity doors 34 and 36 are provided in connection with inlets 30 and 32, respectively. As the fan speed of blowers 20 and 22 increases, thereby drawing a greater volume of air through the apparatus and thus a decreased air pressure within the apparatus, the gravity doors 34 and 36 will tend to open allowing recirculated to mix with fresh air, and thereby improving the efficiency of the system. Of course, the weight of the gravity doors 34 and 36 is chosen in view of the above-described competing interest to achieve a desired balance that controls the mixture of recirculated and fresh air as determined by blower fan speed.

In an alternative embodiment, it may be desired to provide an active air mixture control, rather than the passive control provided by gravity doors. In this regard, it may be desired to provide doors or air valves in connection with each of the inlets, including the fresh air inlet 14. The position of these valves may be controlled by a more sophisticated controller (such as a microprocessor), that is responsive to the user controls, for example, to selectively and variably open and close. Thus, if a user wanted only fresh air circulated through the system, regardless of the fan speed, this could be selectively controlled. Similarly, the user could actively control the system to circulate only recirculated air, or any combination there between.

In keeping with the description of the preferred embodiment, a set of heater coils 40 and a set of cooling coils 42 are disposed within the housing 12 to control the air temperature output therefrom. Controlling the amount and proportion of air suctioned through the inlets and directed across the heating coils 40 and cooling coils 42, controls the temperature of air output from blowers 20 and 22. Before describing the internal structure of housing 12 in detail, reference is made briefly to FIG. 2 which shows the fluid circulatory paths of a vehicle's heating and cooling system.

A typical vehicular air conditioning system includes three principal elements: a compressor 50, a condenser 52, and an evaporator 42. Refrigerant, such as freon, is circulated in a closed-loop path among these devices. The compressor 50 is typically driven off the vehicle drive shaft. In this regard, a pulley/belt drive is provided and periodically clutched on and off to operate the compressor 50. As is well known, rotation of the pulley is imparts an equal rotation to an internal swash plate that is configured to reciprocate pistons to effect the compression and circulation of the refrigerant fluid throughout the cooling system. Since the structure and operation of compressor 50 does not form part of the present invention, it will not be described herein. However, a more detailed understanding of the structure operation of refrigerant compressor assemblies, can be obtained by reference to U.S. Pat. No. 5,186,614 and 5,195,625.

In short, the compressor 50 receives low pressure refrigerant gas on an input line 55, compresses it, and outputs a higher pressure refrigerant gas on output line 56. This high pressure refrigerant gas is then circulated to a condenser 52 where it is converted from gaseous to liquid state. After passing through a filter 57, the refrigerant is then circulated though a valve 58 to an evaporator 42, where it is transformed from a liquid to a gaseous state. Due to the latent energy transfer associated with this transformation from liquid to gaseous state, the evaporator 42 remains very cool. Accordingly, they are often referred to as cooling coils. As shown in the drawing, the output evaporator 54 is then circulated through line 55 back to compressor 50 to complete the closed loop path.

Figure 2:
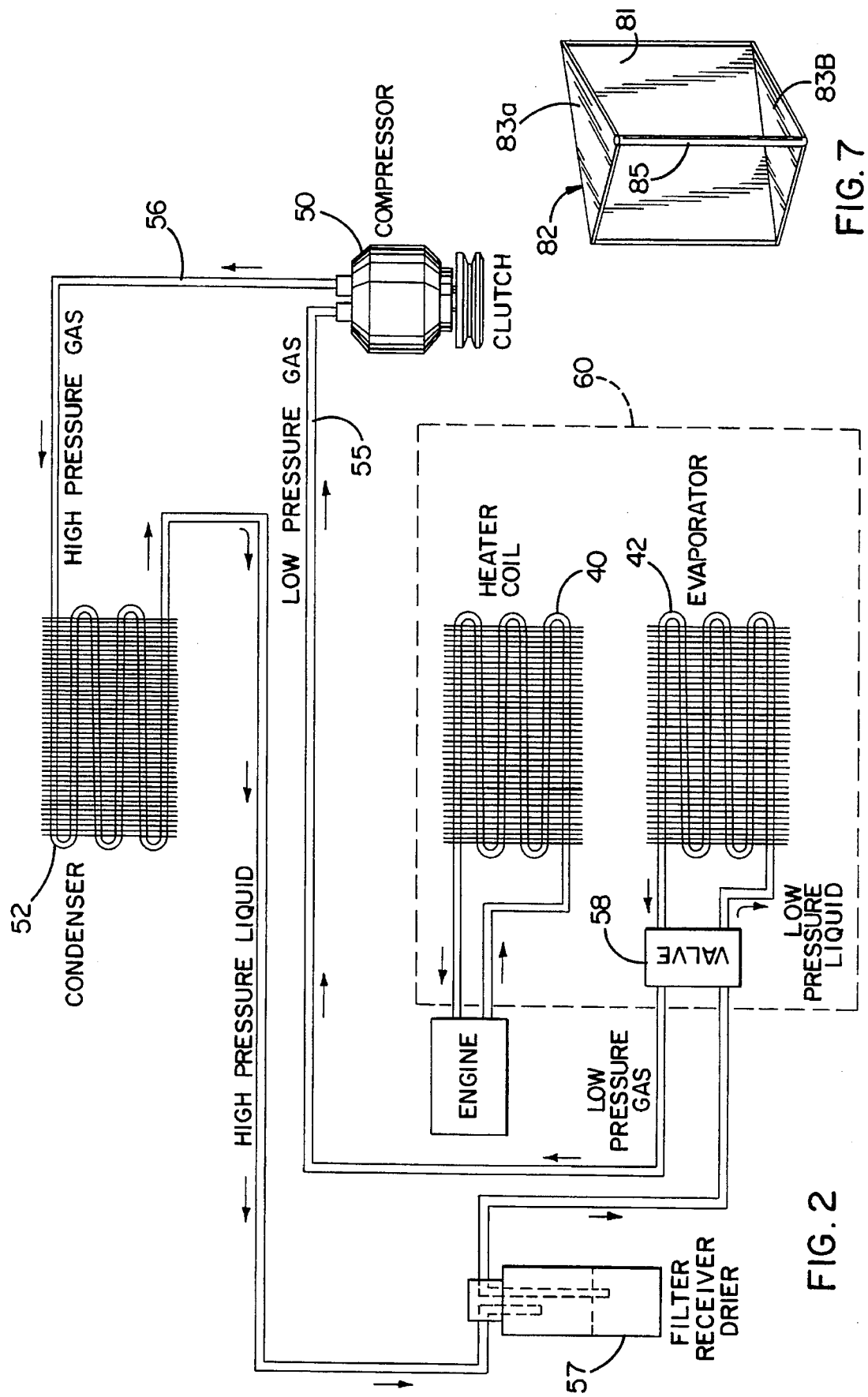
FIG. 2 is a diagram showing the fluid circulation channels of a typical automotive heating and cooling system.

The second circulatory system shown in FIG. 2 includes a set of heating coils 40, which is provided in connection with the vehicle's cooling system. As is known, a water/ antifreeze mix is typically circulated through a vehicle radiator and passages within the engine block to transfer and dissipate heat from the engine. Fluid circulated within the system is passed through coils 40, and tends to heat the coils, which are accordingly referred to as heater coils. The rectangle 60 (illustrated in phantom line) illustrates the physical disposition of the apparatus of the present invention. Namely, the location of heating coils 40 and cooling coils 42 are shown within the rectangle 60.

Although not shown in the figures, prior art vehicle ventilation systems offering dual temperature control include two sets of heating coils 40 and two sets of the cooling coils 42. As in known (but not shown), multiple heating coils 40 are series connected to provide a complete circulatory path within the engine's cooling system. Cooling coils 42, however, are disposed in parallel, in order to function properly, since the coils 42 serve to transform refrigerant from a liquid to a gaseous state.

Returning to FIG. 1, the cooling coils 42 are disposed near the air inlets 14, 30 and 32. As is known, the coils 42 are embedded within a plurality of closely-spaced elongated metal fins which enhance the convection cooling from air blown across the surface. Partitions 64a and 64b extend between each end of the cooling coils 42 and the housing 12 to define an inlet chamber for air suctioned through air inlets 14, 30 and 32.

An air filter 66 is disposed in juxtaposition with cooling coils 42. More particularly, the air filter 66 is captured between opposing U-shaped upstanding brackets 68 and 70, whereby initial and replacement filters 66 may readily slide into position between the brackets 68 and 70. Air suctioned through the inlets 14, 30, and 32 into the inlet chamber then passes through filter 66 before being circulated throughout the system.

Partitions 72a, 72b, and 73 serve in part to define first and second fluid communication channels within the housing 12, and which will be described in greater detail below. These fluid communications channels are sometimes referred to herein as fluid flow paths. Channel partition 72a extends between the heating coils 40 and the downstream side of cooling coils 42. Channel partition 72b extends between the heating coils 40 at a point opposing but substantially aligned with partition 72a, and the housing 12. As illustrated, the channel partitions 72a and 72b intersect the heating coils 40 and cooling coils 42 so as to define first and second parts of the coils subject to air flow passing to outlets 16 and 18, respectively.

Flow valves or baffles 80 and 82, also known as air blending doors, are disposed within the first and second fluid communication channels as defined by partitions 72a, 72b and 73 to controllably direct air from the air inlets 14, 30 and 32 across the cooling coils 42, heating coils 40, and through the outlets 16 and 18. In the preferred embodiment, the flow valves 80 and 82 each pivot about an axis to move between open (heat) and closed (cool) positions. In the open position, the entirety of the air flow in the respective communication channel is directed across the heating coils 40 before being expelled through the air outlet. In this way, hot air is expelled. In the closed position, flow valves 80 and 82 serve to block air from reaching the heating coils 40, and therefore expel cold air from the air outlets. Continuous and variable intermediate positions provide a wide range of air mixtures (e.g., hot and cold) to effect a wide range of temperature variation at the outlets.

Reference is made briefly to FIG. 7, which shows an elevated perspective view of valve 82. In accordance with the preferred embodiment, valve 82 includes a flat panel 81 attached to rotate about an axis defined by rod 85. More specifically, triangular-shaped supports 83a and 83b are each attached at a vertex to rod 85, support 83a being attached near one end of rod 85 and support 83b being attached near the other end. Panel 81 is attached to supports 83a and 83b along the side of each support opposite the vertex.

As is illustrated schematically in FIG. 1, it is preferred that the flow valves operate by rotating about an axis, wherein the rotation is controlled by motors or actuators 86 and 88. As will be appreciated, the limited angle motors 86 and 88 are responsive to user controls 90, (i.e., temperature control setting), such as rheostats, disposed within the cab space of the vehicle. In another embodiment, the user controls may be of the type that automatically control the flow valves in response to cabin temperature. In yet another embodiment, the flow valves could be pivoted in response to mechanical linkages connected with user controls 90. Furthermore, and consistent with the concepts and teachings of the present invention, the flow valves may comprise a variety of structural variations, such as sliding doors, that work to controllably open and close the fluid communication channels directing air across the heating coils 40.

Figure 3:
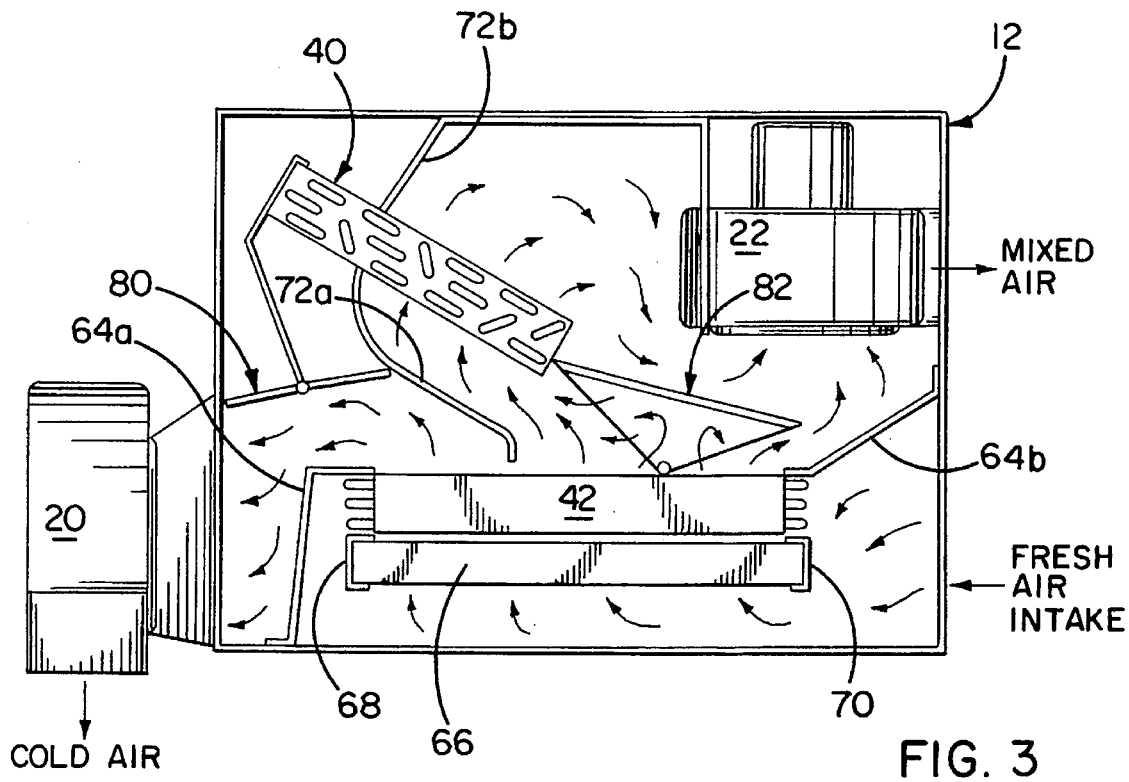
FIGS. 3 through 6 are cross-sectional top views of the dual-channel vehicular ventilation apparatus of FIG. 1, illustrating various air flows through the first and second fluid communication channels as controlled by different positions of the first and second flow valves.

Reference will now be made to FIGS. 3–6, which illustrate the flow valves 80 and 82 in various positions, to effect various air temperature through the first and second fluid communication channels. Referring first to FIG. 3, as previously described channel partitions 72a and 72b cooperate to broadly define the two fluid communication channels within the housing 12. Partitions 64a and 64b define an inlet chamber that is not channel specific. The flow valves 80 and 82 are positioned within the two fluid communication channels to controllably direct air across the heating coils 40. As can be seen from the figures, the flow valves 80 and 82 do not effect air directed across cooling coils 42. That is, all air directed through the air inlets 14, 30 and 32 passes across cooling coils 42, which is preferred since air flow across the cooling coils prevents the cooling coils from freezing. It will be appreciated that, if no cool air is desired, the air conditioning system may be turned off by the user controls 90 (FIG. 1) and the compressor 50, which terminates the circulation of refrigerant. In this way, the effect of cooling coils 42 would be negated, since without refrigerant circulating through the system no cooling effect would be achieved by the coils. In this regard, it can be appreciated that broader concepts of the present invention apply equally to ventilation systems on vehicles not having an air conditioning, and thus no cooling coils. In these systems, flow valves 80 and 82 serve to control the flow of vented air across heating coils 40.

In FIG. 3, flow valve 80 is shown in the fully-closed position, and flow valve 82 is shown in an intermediate position. As illustrated by the arrows, air flowing from the inlet chamber across cooling coils 42 splits through respective first and second channels as defined by channel partition 72a and 72b. Air flowing through the first channel (left hand side) is blocked, by the closure of flow valve 80, from reaching heating coils 40. Thus, cold air (assuming the air conditioning system is on) is expelled from blower 20. In contrast, flow valve 82 is positioned in an intermediate position whereby a portion of the air in the second communication channel is directed across heating coils 40 and onto blower 22, while a portion of the air is passed directly from cooling coils 42 to the blower 22. This results in a mixture of cold and warm air, thereby providing mixed air of an intermediate temperature at the output of blower 22.

Figure 4:
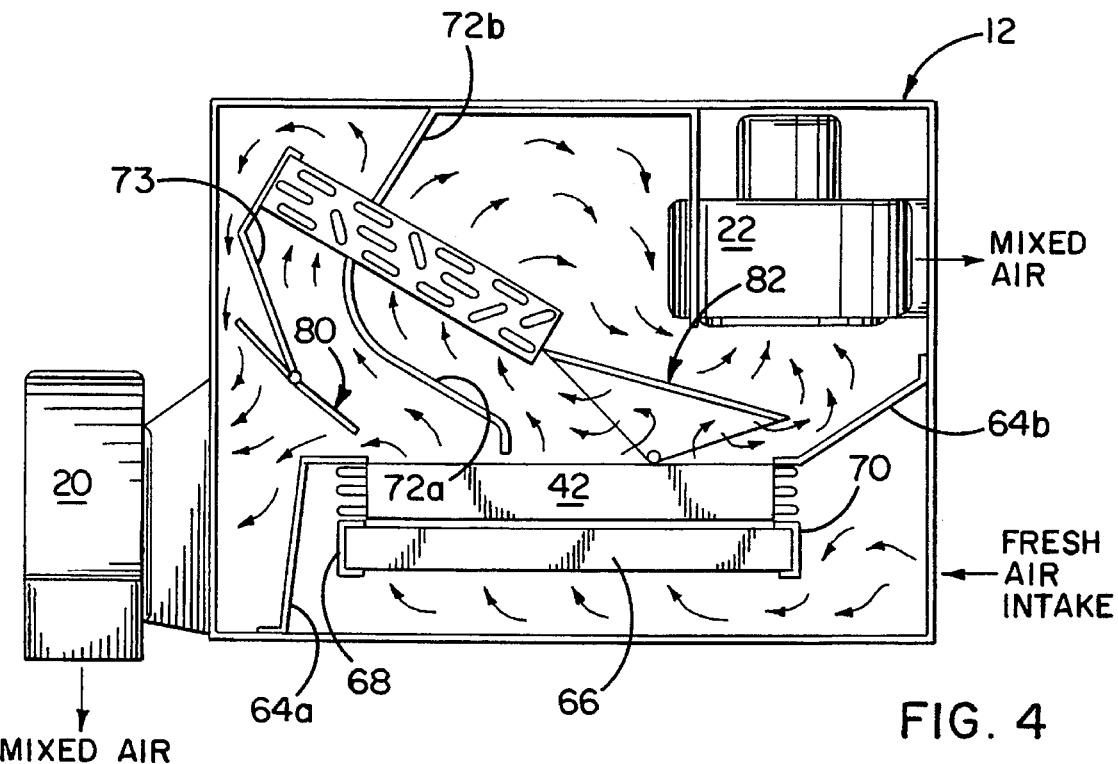

Turning now to FIG. 4, flow valve 82 is shown in a similar position as that shown in FIG. 3. Accordingly, the air flow through the second fluid communication channel (right side) is as described in connection with FIG. 3. Flow valve 80, however, is illustrated in an intermediate position. Thus, a portion of the air passing across cooling coils 42 is directed across heating coils 40, while a portion of the air is passed directed from cooling coils 42 to blower 20. Accordingly, a mixture of cold and warm air is expelled from blower 20 to provide an intermediate temperature.

Figure 5:
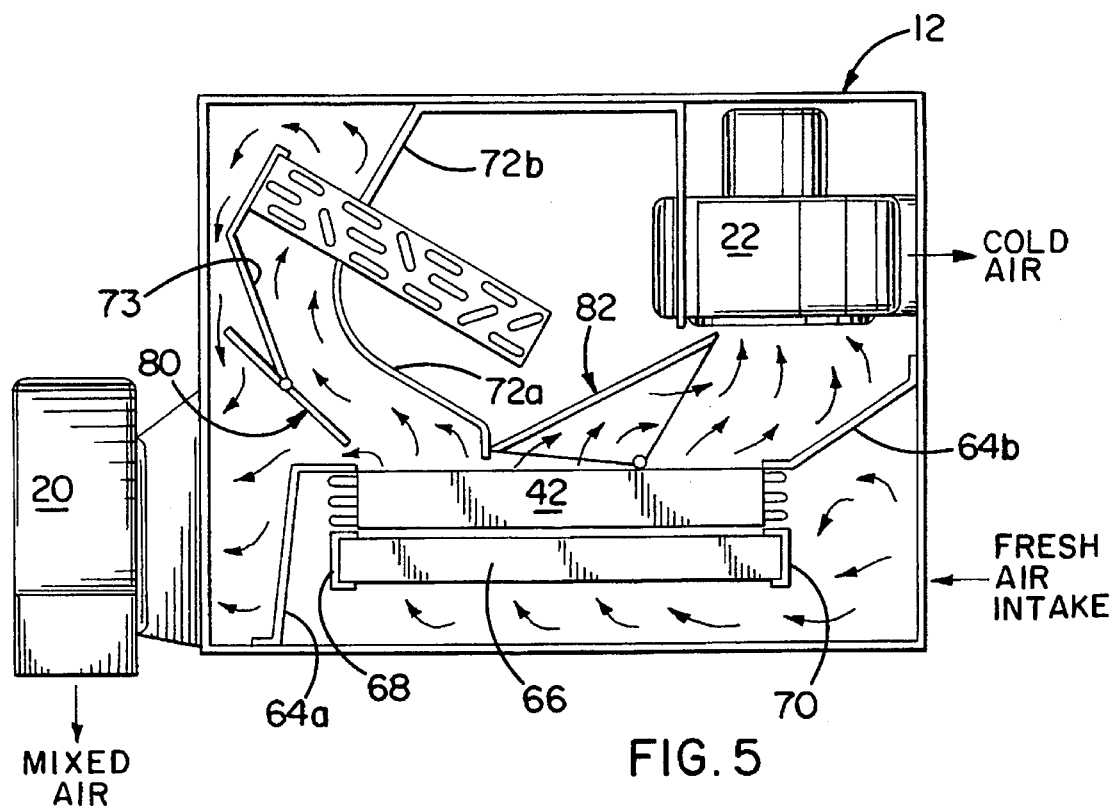

FIG. 5 shows flow valve 80 in the intermediate position described in FIG. 4. However, flow valve 82 is illustrated in the fully-closed position. In this position, the entirety of the air in the second channel is passed directly from cooling coils 42 to blower 22, which thus expels cold air.

Figure 6:
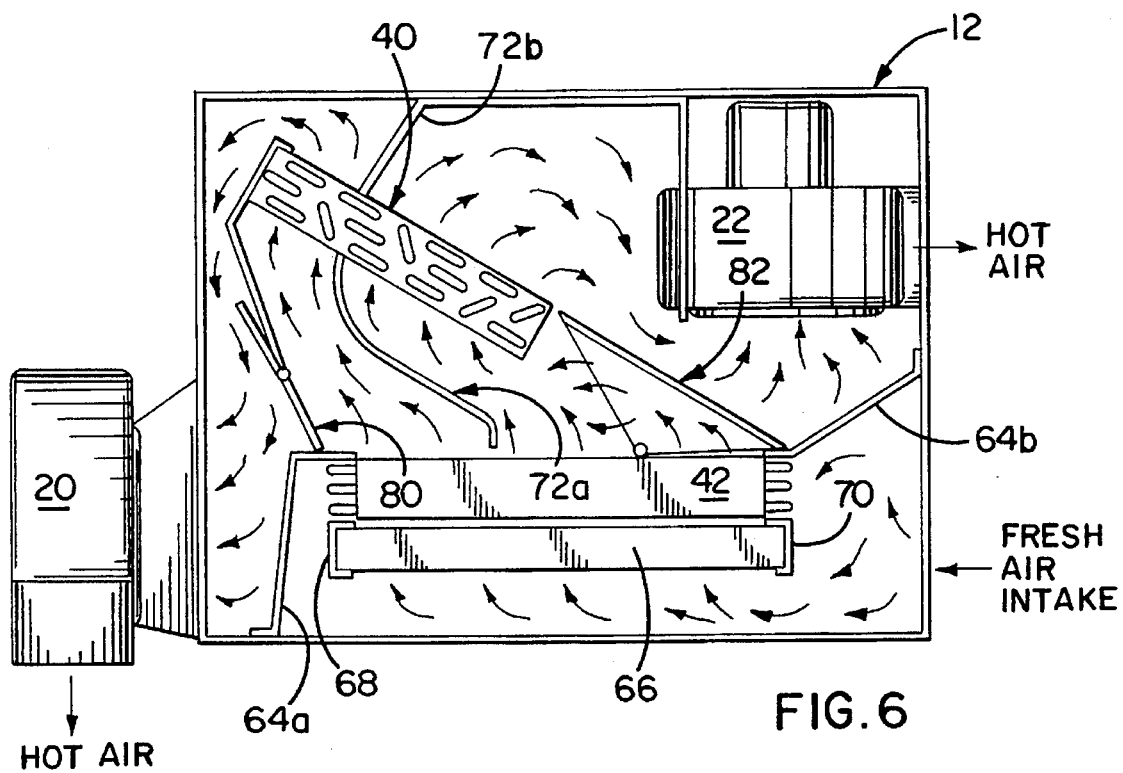

Turning now to FIG. 6, both flow valve 80 and flow valve 82 are shown in their fully-open positions. As shown in its fully-open position, flow valve 80 pivots into contact with partition 64a to prevent air from passing directly from cooling coils 42 to blower 20. Instead, the entirety of the air passing through the first channel is forced to flow across heating coils 40 thus expelling hot air from blower 20. Similarly, flow valve 82 is rotated so as to close off the direct air passage between cooling coils 42 and blower 22. As a result, the entirety of the air in the second fluid communication channel passes across heating coils 40 and on to blower 22, thus expelling hot air therefrom.

It can be appreciated that a variety of partition structures and configurations can be utilized to implement the concepts and teachings of the present invention. The embodiment illustrated in the figures exemplifies one such configuration. Indeed, the dual-channel device illustrated has been partitioned vertically to establish separate channels within housing 12. It can be appreciated, however, that in an alternative embodiment the housing 12 may be partitioned in an horizontal fashion, wherein a first fluid communication channel would be provided in the upper partition, and a second fluid communication channel in a lower partition. A single flow valve would then be provided in each the upper and lower fluid communication channels.

To better illustrate this alternative embodiment, consider presently known single channel ventilation apparatus. As previously described, systems presently operate in a single channel fashion to controllably direct air across heating coils. A system of this configuration could be split into separate channels by effecting a horizontal partition. In like fashion, the flow valves while independently controlled, may be identical in structure and positioned directly overtop one another. In yet a further embodiment, additional partitions may be disposed within the housing 12 to define additional fluid communication channels. For example, if it was desired to provide a system having three independently controlled temperature registers, partitions within the housing 12 could be disposed to define three separate fluid communication channels.

The preferred embodiment disclosed has partitions 64a and 64b to define a common inlet chamber. In an alternative embodiment, this inlet chamber may be partitioned, and separate fresh air and recirculated air inlets provided to correspond with each separate inlet chamber. Thus, in the presently preferred embodiment, wherein each blower 20 and 22 effects air flow within the inlet 14 and inlet chamber, partitioning the inlet chamber and providing additional air inlets, the blowers 20 and 22 could provide independent air flow throughout the entire housing 12. In yet a further embodiment, rather than providing independent blowers 20 and 22 at the air outlets, a single blower could be provided at the inlet 14. This would, of course, permit only a single fan speed control, but would nevertheless permit independent temperature control between the two channels as provided by the dual channel structure.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A multi-channel motor vehicle ventilation apparatus comprising:

a housing having at least one air inlet and first and second air outlets;

a heating coil disposed within the housing;

baffles in the housing separating the heating coil into first and second parts interposed in first and second fluid flow paths respectively, the first fluid flow path extending between the at least one air inlet to the first air outlet and including the first part of the heating coil, the second fluid flow path extending between the at least one air inlet to the second air outlet and including the second part of the heating coil;

first and second blowers associated with the first and second air outlets, the first blower disposed to direct air into the at least one air inlet, through the first fluid communication channel, and out the first air outlet, the second blower disposed to direct air into the at least one air inlet, through the second fluid communication channel and out the second air outlet; and first and second flow valves independently operable to direct a portion of the air flow passing through each fluid flow path across the heating coil, the first and second flow valves being disposed in the first and second fluid flow paths respectively for movement between heat and cool positions, each flow valve being positioned to direct a maximum channel air flow across the associated part of the heating coil, when disposed in the heat position and to direct a minimum channel air flow across the associated part of the heating coil when disposed in the cool position.

2. The multi-channel motor vehicle ventilation apparatus according to claim 1, wherein the first and second flow valves are responsive to manually operated temperature controls.

3. The multi-channel motor vehicle ventilation apparatus according to claim 2, wherein the first and second flow valves are disposed for rotary movement about an axis, between heat and cool positions.

4. The multi-channel motor vehicle ventilation apparatus according to claim 3, further including first and second rotary actuators that are responsive to manually operated temperature controls to independently operate the first and second flow valves respectively.

5. The multi-channel motor vehicle ventilation apparatus according to claim 4, wherein the at least one air inlet includes a fresh air inlet and a recirculated air inlet.

6. The multi-channel motor vehicle ventilation apparatus according to claim 1, further including a cooling coil disposed within the housing near the at least one air inlet, whereby air entering the at least one inlet passes across the cooling coil.

7. A multi-channel motor vehicle ventilation apparatus comprising:

- a housing having an air inlet and first and second air outlets, the air inlet being in fluid communication with each air outlet;
- a blower disposed to direct a transfer of air from the air inlet to each air outlet;
- partitions disposed within the housing to define at least two fluid flow paths for air passage, each fluid flow path extending between the air inlet and an air outlet;
- a heating coil disposed within the housing, the partitions dividing the heating coil into first and second parts situated in the first and second fluid flow paths respectively; and
- at least two independently operable flow valves disposed within the housing for movement between first and second positions, each valve being disposed to selectively direct a proportion of the air, passing through each fluid flow path across the associated part of the heating coil.

8. The multi-channel motor vehicle ventilation apparatus according to claim 7, wherein a first and second blower are associated with the first and second air outlets, the first blower is disposed to direct air into the air inlet, through the first fluid flow path across the first part of the heating coil, and out the first air outlet, the second blower is disposed to direct air into the air inlet, through the second fluid flow path across the second part of the heating coil, and out the second air outlet.

9. The multi-channel motor vehicle ventilation apparatus according to claim 8, wherein the first and second blowers are independently operable and responsive to an external manual control.

10. The multi-channel motor vehicle ventilation apparatus according to claim 7, wherein the movement of the flow valves is responsive to external manual controls to effect temperature control of the air discharged at the air outlets.

11. The multi-channel motor vehicle ventilation apparatus according to claim 7, further including a cooling coil disposed within the housing and positioned in at least one of the fluid communication channels.

12. The multi-channel motor vehicle ventilation apparatus according to claim 11, wherein the cooling coil is positioned near the air inlet, whereby the air entering the air inlet passes across the cooling coil.

13. The multi-channel motor vehicle ventilation apparatus according to claim 12, wherein the partitions and flow valve cooperate to define separate fluid flow paths downstream of the cooling coil.

14. The multi-channel motor vehicle ventilation apparatus according to claim 7, including a plurality of air inlets.

15. The multi-channel motor vehicle ventilation apparatus according to claim 7, wherein the vehicle is a heavy-duty truck.

16. A multi-channel ventilation apparatus for a motor vehicle comprising:

- a housing having at least one air inlet and a first and a second air outlet for ventilating different portions of the vehicle;
- two blowers attached to the housing for directing air flow to the first and second outlets, respectively;
- separate speed controls for the blowers for individually controlling the air flow in the two outlets;
- a heating coil connected to receive coolant from the engine and a cooling coil, each of said coils being positioned in the housing, and each having a first portion subject to air flow passing to the first outlet and a second portion subject to air flow passing to the second outlet;
- a first baffle in the housing and associated with the first portion of the heating coil for controlling the proportion of air to the first outlet which passes through the heating coil;
- a second baffle in the housing and associated with the second portion of the heating coil for controlling the proportion of air to the second outlet which passes through the heating coil; and
- separate temperature controls for the respective first and second baffles for independently controlling the temperature of the air flowing through the first and second outlets.

17. The multi-channel ventilation apparatus according to claim 16, wherein the first and second baffles have planar surfaces that are controllably positioned within the housing to control the flow of air across the first and second parts of the heating coil.

18. The multi-channel ventilation apparatus according to claim 17, wherein each of the first and second baffles are controllably rotated about an axis to position the planar surfaces to define passages that controllably direct air flow across the first and second parts of the heating coil.

* * * * *